INVENTOR.
ANTHONY LANG
BY Rudolph L. Lowell
ATTORNEY.

Sept. 11, 1956                A. LANG               2,762,226
APPARATUS FOR TRANSMITTING POWER FROM
A FARM TRACTOR TO A JACK ELEVATOR
Filed Oct. 6, 1952                                        2 Sheets-Sheet 2
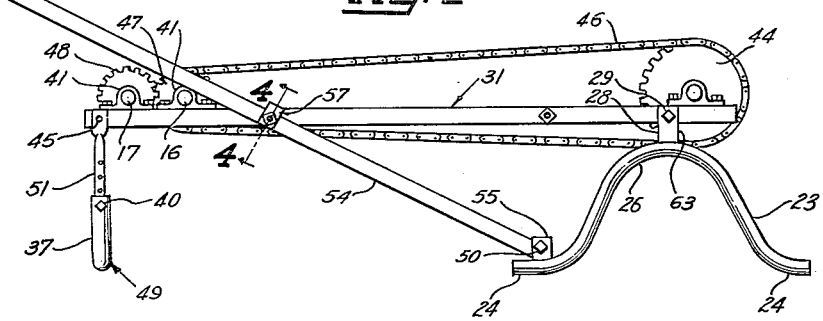
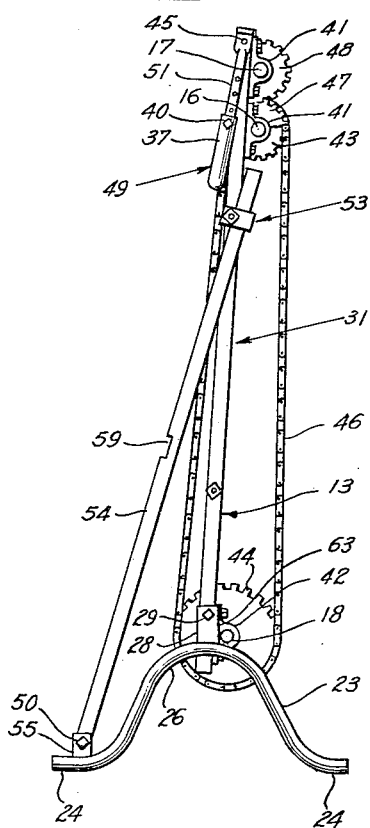
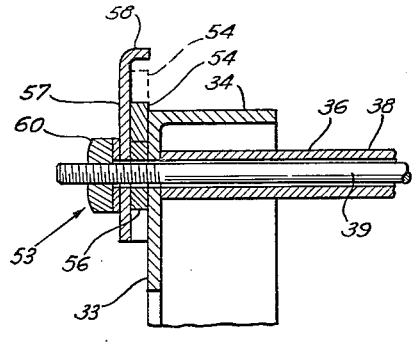
*INVENTOR.*
*ANTHONY LANG*
BY
*ATTORNEY.*

… (United States Patent Office)

2,762,226

APPARATUS FOR TRANSMITTING POWER FROM A FARM TRACTOR TO A JACK ELEVATOR

Anthony Lang, Laurens, Iowa

Application October 6, 1952, Serial No. 313,287

3 Claims. (Cl. 74—216.5)

This invention relates generally to power transmitting apparatus and more particularly to an apparatus for transmitting power from a farm tractor to a jack elevator in the unloading of grain for storage.

When grain has been harvested, it is the usual farm practice to transport the grain in a wagon towed by a tractor from the field to a storage bin. The grain is then unloaded from the wagon and placed in a jack elevator or conveyor for carrying the grain into the storage bin. It is therefore desirable that a power transmitting apparatus be disposed adjacent the elevator so that the power take-off on the towing tractor can be utilized to drive the elevator.

It is an object of this invention, therefore, to provide an improved apparatus for transmitting power from a farm tractor to a jack elevator in the unloading of grain for storage.

A further object of this invention is to provide a power transmitting apparatus which can readily be connected between a tractor power take-off and an elevator and which is also movable to an inoperative position out of the path of travel of the tractor and wagon when the wagon is being moved into and out of an unloading position relative to the elevator.

A further object of this invention is to provide a power transmitting apparatus in which a base structure pivotally supports a coupling structure for movement between a horizontal operative position and an upright inoperative position.

A further object of this invention is to provide a power transmitting apparatus having a coupling structure supported for pivotal movement between a horizontal operative position and an upright inoperative position and in which the coupling structure is self-supported in the upright position so as to eliminate the need for any additional brace or supporting structure.

Another object of this invention is to provide a power transmitting apparatus which includes a pivotally movable coupling structure and a releasable latch means for latching the coupling structure in the operative position of the power transmitting apparatus.

A further object of this invention is to provide a power transmitting apparatus which is economical to manufacture, rugged in construction, and which includes a coupling structure readily movable between operative and inoperative positions relative to the power take-off of a farm tractor.

Further objects, features and advantages of this invention will be apparent from a consideration of the following description when taken in connection with the accompanying drawings in which:

Fig. 2 is a side elevational view of the power transmitting apparatus;

Fig. 3 is a side elevational view of the power transmitting apparatus shown in its upright inoperative position; and Fig. 4 is a detail sectional view as seen along the line 4—4 in Fig. 2.

Figure 1:
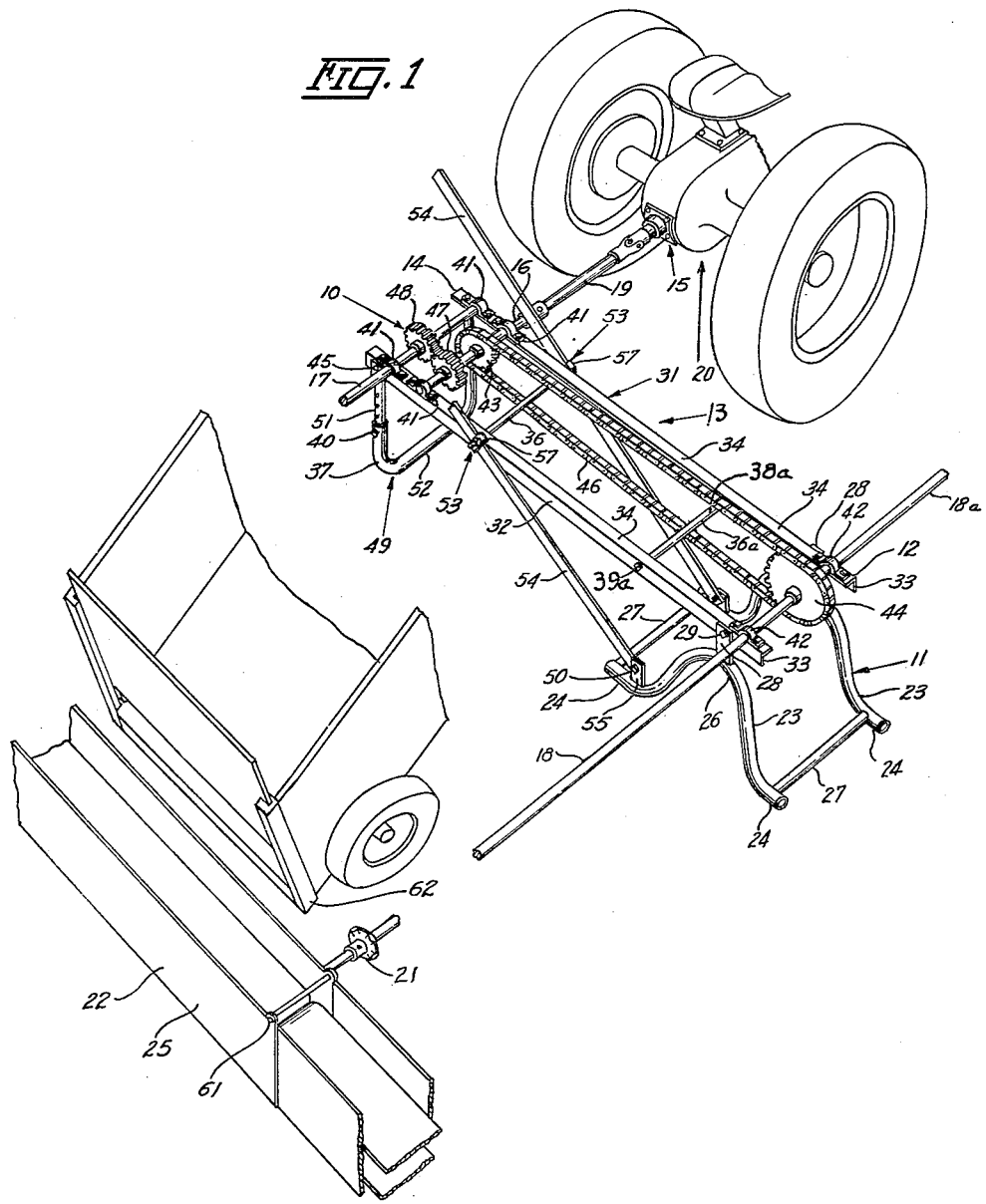
Fig. 1 is a perspective view of the power transmitting apparatus of this invention shown in operative relation with the power take-off of a farm tractor and a jack elevator for receiving grain dumped from a wagon.

With reference to the drawing, the power transmitting apparatus of this invention, indicated generally at 10, is shown in Fig. 1 in operative relation with the power take-off unit 15 on a farm tractor, only a rear end portion 20 of which is illustrated.

The power transmitting apparatus 10 consists of a base or supporting structure 11 to which is pivotally connected one end 12 of an elongated coupling structure 13. For convenience of description, the end 12 of the coupling 13 is hereinafter referred to as the pivoted end and the other end 14 is referred to as the free end. Arranged at the free end 14 of the coupling structure 13 are a pair of parallel oppositely extended drive shafts 16 and 17 adapted to be connected alternatively to the tractor power take-off unit 15 by means of a telescopic shaft 19. A driven shaft 18 is supported on the coupling structure 13 adjacent the pivoted end 12 thereof for connection to the driving mechanism 21 of a usual jack elevator, only a portion 22 of which is shown.

The base structure 11 includes a pair of transversely spaced tubular standards 23 provided with horizontal ground engaging feet portions 24 and central portions 26 of an inverted U-shape. A pair of tubular brace members 27 are extended between the oppositely disposed feet 24 of the standards 23 for maintaining the standards 23 in an upright spaced relation.

Secured to the top of the U-shape portions 26 of the standards 23 and extended upwardly therefrom are a pair of upright support members 28. Arranged between the support members 28 is the pivoted end 12 of the coupling structure 13 which is mounted on pivot members 29 carried by the support members 28.

The coupling structure 13 includes a frame structure 31 which consists of a pair of transversely spaced angle iron members 32 having one of their legs 33 extended vertically downwardly in a parallel relation and their other legs 34 horizontally extended toward each other. A pair of sleeve and rod assemblies 36 and 36a which include rods 39 and 39a inserted through sleeves 38 and 38a, respectively, are attached to and extended between the vertical legs 33 of the angle iron members 32 at longitudinally spaced positions for maintaining the members 32 in a predetermined transversely spaced relation.

The drive shafts 16 and 17 are mounted in bearings 41 (Figs. 1 and 2) secured to the horizontal legs 34 of the angle members 32 so that the shafts 16 and 17 extend in a parallel relation in opposite directions outwardly of the frame 31 adjacent the free end 14 thereof. Similarly, the driven shaft 18 is carried in a pair of bearings 42 supported on the horizontal legs 34 of the angle iron members 32 adjacent the pivoted end 12 of the frame 31 at a position spaced slightly rearwardly of the pivot members 29.

Rigidly mounted on the drive shaft 16 and the driven shaft 18, respectively, are a pair of sprocket wheels 43 and 44. Trained about the sprocket wheels 43 and 44 for movement longitudinally of the frame 31 is an endless sprocket chain 46 of a roller or link type. Also carried on the drive shaft 16 is a gear 47 which is in meshed engagement with a similar gear 48 mounted on the drive shaft 17 so that rotation of the drive shaft 17 results in rotation of the drive shaft 16 to drive the driven shaft 18 through the chain 46.

Pivotally attached to the free end 14 of the frame 31 is an upright telescopic leg unit 49 which includes a pair of extensible upright leg members 51 telescopically received within the legs 37 of a U-shape base section 52. The leg members 51 are held in adjusted positions within the base section legs 37 by a pair of set screws 40. The upper ends of the legs 51 are pivotally connected by means of a pair of pivots 45 to the vertical legs 33 of the angle members 32 so that the base section 52 of the unit 49 is vertically adjustable to maintain the coupling structure 13 in a horizontal operating position when the ground surface on which the unit 49 is supported is at a different elevation than that on which the base section 11 is supported.

To latch the coupling structure 13 in its substantially horizontal operative position in which one of the drive shafts 16 and 17 is connected to the power take-off unit 15 (Figs. 1 and 2) and to preclude any upward movement of the coupling 13 about its pivots 29, a latching structure 53 is provided. The latch 53 includes a pair of elongated latch bars 54 pivotally connected by means of pins 50 to a pair of upright plates 55 secured to the corresponding standards 23. The bars 54 are mounted in a straddling relation with the coupling 13 so as to be rideable on a pair of collars 56 mounted on the rod 39 of the sleeve and rod assembly 36 outwardly of the upright angle iron legs 33. A pair of guide plates 57 having bent top portions 58 are assembled on the ends of the rod 39 outwardly of the collars 56 so that the portions 58 of the guide plates 57 function to confine the latch bars 54 to positions between the legs 33 and guide plates 57 during the riding movement of the bars 54 on the collars 56. A pair of nuts 60 are threadably mounted on the ends of the rod 39 for holding the guide plates 57 and collars 56 in an assembled relation on the rod 39. A pair of notches 59 are formed in the latch bars 54 at positions such that the notches 59 are received on the collars 56 when the coupling 13 is in its substantially horizontal operative positions shown in Figs. 1 and 2.

In the operation of the power transmitting apparatus 10, assume that the apparatus is in its inoperative position shown in Fig. 3 and is disposed adjacent a jack elevator 22 (Fig. 1). The pivoted portion 25 of the jack elevator 22 is first swung upwardly about its hinge 61 to an upright position to allow a loaded wagon to be towed by a tractor through the space previously occupied by the pivoted portion 25 when in its horizontal position. The wagon is then disconnected from the tractor and a suitable hoist (not shown) is utilized to lift the front end of the wagon such that the wagon rear end 62 is in the dumping position shown in Fig. 1. The tractor is then driven forwardly so that its rear end 20 is positioned as also shown in Fig. 1.

The coupling 13 is then manually swung counter-clockwise as viewed in Fig. 3 from the upright position shown in Fig. 3 to the operative or horizontal position shown in Figs. 1 and 2. During such swinging movement of the coupling 13 the latch bars 54 slide on the collars 56 until the coupling 13 reaches its substantially horizontal position shown in Figs. 1 and 2 at which time the notches 59 engage the collars 56 to effectively latch the coupling in its operative position. The telescopic leg unit 49 is then adjusted so as to engage the ground surface to maintain the coupling 13 in the horizontal operative position shown in Figs. 1 and 2 as defined by the reception of the collars 56 in the latch bar notches 59. The drive shaft 16 is then connected to the power take-off 15 by means of the telescopic shaft 19 and the driven shaft 18 connected to the driving mechanism 21 for the elevator 22. The tractor power take-off unit 15 is then operated to drive the drive shaft 16 which in turn operates the chain 46 to drive the driven shaft 18 for operating the elevator 22.

When the wagon 62 has been unloaded, the drive shaft 16 is disconnected from the power take-off unit 15 by releasing the connecting shaft 19 and the driven shaft 18 is disconnected from the driving mechanism 21 for the elevator 22.

The coupling 13 is then swung to its inoperative position (Fig. 3) by first releasing the latch structure 53 which is accomplished by manually lifting the bars 54 so as to disengage the notches 59 and the collars 56. Concurrently with the release of the latch structure 53, the free end 14 of the coupling 13 is swung upwardly and rearwardly about the pivots 29 to an inoperative stop position defined by the contact engagement of the driven shaft 18 with the sides 63 of the upright support members 28 (Fig. 3). During such swinging movement of the coupling 13, the latch bars 54 ride on the collars 56 between the collars and the curved portions 58 of the guide plates 57, as shown in dotted lines in Fig. 4.

The driven shaft 18 is positioned on the frame 31 at a location relative to the pivots 29 such that the shaft 18 contacts the sides 63 of the support members 28 when the coupling structure 13 is substantially upright but inclined upwardly in one direction from a vertical plane through the pivot members 29. It is seen, therefore, that the sides 63 of the support members 28 constitute stop means for engagement with the coupling 13 for limiting the pivotal movement of the coupling 13 to its self-supported position shown in Fig. 3.

As a result, the coupling 13 in its position shown in Fig. 3, is biased by gravity in a clockwise rotational movement, as viewed in Fig. 3, and is restrained against rotational movement in this direction by the contact of the shaft 18 and the upright support members 28. Thus the coupling 13 is self-supported in the inoperative position of Fig. 3 until such time as the coupling 13 is manually rotated in a counter-clockwise direction as viewed in Fig. 3 to its operative position shown in Figs. 1 and 2.

The tractor 20 is then driven rearwardly and connected to the wagon 62, and the wagon towed away for further loading.

The drive shaft 17 is provided for those situations in which it is not convenient for the apparatus 10 to be positioned relative to the tractor 20 as illustrated in Fig. 1. For these situations the oppositely extended portion 18a of the driven shaft 18 is connected to the elevator 22 which in this case would be located on the same side of the apparatus 10 as the shaft portion 18a. In other words, the driven shaft 18 is extended in two directions from the coupling 13 and the two oppositely extended drive shafts 16 and 17 are provided so that the apparatus 10 is adapted for what might be termed a right and left hand operation.

From the above description, it is seen that this invention provides a power transmitting apparatus 10, for use in the unloading of grain for storage, which is normally disposed in a substantially horizontal operative position but which is also readily movable to and from an inoperative position out of the path of travel of a tractor and wagon when the wagon is being moved into and out of an unloading position. In both its operative and inoperative positions, the apparatus 10 and the coupling 13 are self-supported so as to eliminate the need for additional brace or supporting structure. A latch structure 53 is made a part of the power transmitting apparatus 10 for quickly and effectively latching the apparatus in its operative position.

Although the invention has been described with respect to a preferred embodiment thereof, it is to be understood that it is not to be so limited, since changes can be made therein which are within the full intended scope of this invention as defined by the appended claims.

I claim:

1. Power transmitting apparatus comprising a longitudinally extended frame, a drive shaft carried by said frame adjacent an end thereof, a driven shaft carried by and extended transversely of said frame adjacent the other end thereof, means extended between said shafts for driving said driven shaft from said drive shaft, a pair of transversely spaced upright supporting members disposed adjacent said other end of the frame, pivot means extended through said supporting members and said frame, with said driven shaft and said supporting members being arranged relative to each other such that upon pivotal movement of said frame to a substantially upright position said driven shaft engages said supporting members so that said frame is supported in said substantially upright position.

2. Power transmitting apparatus comprising a base structure, a longitudinally extended coupling structure having a pair of ends, said coupling structure being pivotally attached at one of its ends to said base structure for pivotal movement of said coupling structure in a vertical plane, an elongated latch member pivotally attached at one of its ends to said base, said latch member having a notch formed therein, a notch engaging member secured to said coupling structure with said latch member being positioned so as to be rideable on said notch engaging member during a pivotal movement of said coupling structure and said notch being formed in said latch member at a location such that said notch engaging member is received in said notch when said coupling structure is in a substantially horizontal position whereby to restrain movement of said coupling structure away from said horizontal position.

3. Power transmitting apparatus comprising a longitudinally extended coupling structure having a pair of ends, a base structure disposed beneath one of said ends, pivot means carried by said base structure and extended transversely through said coupling structure whereby the coupling structure is pivotally movable about said pivot means between a horizontal operative position and a substantially upright inoperative position, said coupling structure including a shaft arranged relative to said pivot means and said base such that said shaft contacts the base when said coupling structure is in said substantially upright position to thereby prevent further pivotal movement of said coupling structure, and means including a notched bar pivotally secured at one of its ends to said base structure for latching the coupling structure in said horizontal operative position.

References Cited in the file of this patent
UNITED STATES PATENTS

| | | |
|---|---|---|
| 341,596 | Mitchell | May 11, 1886 |
| 2,505,087 | Athy et al. | Nov. 2, 1950 |
| 2,549,247 | Scott | Apr. 17, 1951 |